United States Patent Office 3,770,705
Patented Nov. 6, 1973

3,770,705
THERMOSETTING RESINS PREPARED FROM
DIMALEIMIDES AND ISOCYANURIC ACID
OR DERIVATIVE THEREOF
Keiiti Akiyama and Kiyoji Makino, Yokosuka, Japan,
assignors to Tokyo Shibaura Electric Co., Ltd., Kawa-
saki-shi, Japan
No Drawing. Filed June 9, 1972, Ser. No. 261,322
Claims priority, application Japan, July 14, 1971,
46/51,787; Sept. 23, 1971, 46/73,781
Int. Cl. C08g 20/32
U.S. Cl. 260—78 UA                           1 Claim

ABSTRACT OF THE DISCLOSURE

A heat-resistant thermosetting resin composition is formed by mixing and heating (a) 85 to 55% by mol of N,N'-substituted dimaleimide represented by the following general formula:

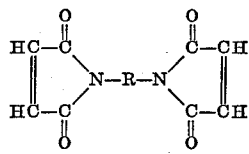

where R is

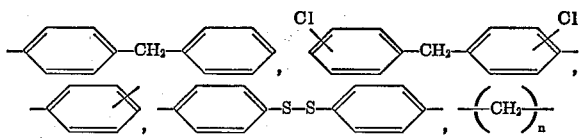

$n$ is an integer of from 1 to 6; with (b) 15 to 45% by mol of an isocyanuric acid and/or derivative thereof represented by the following general formula:

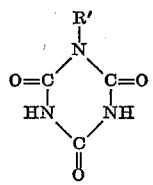

where R' is H or a member selected from the group consisting of alkyl, and allyl. This resin composition is characterized by excellent heat resistance, resistance to cracking induced by heat-cycling, excellent mechanical strength and good bonding properties.

BACKGROUND OF THE INVENTION

Field of the invention

This invention relates to a heat-resistant thermosetting resin composition having excellent mechanical strength, good bonding properties, and good resistance to cracking induced by heat-cycling, and to a method for preparing the same.

Description of the prior art

Heretofore, epoxy resins, phenol resins and polyester resins have been impregnated into, or coated onto, the matrices of glass cloth, cotton cloth, paper or the like to prepare so-called "prepregs" upon drying. The prepreg is cut into numerous sheets of a desired size, and these sheets are piled one on the other to a suitable depth. Upon hot pressing the composite at temperatures of from 150 to 250° C., under high pressures, a laminate structure is formed.

These types of laminates, however, have demonstrated several undesirable defects which have hindered their full acceptance by industry, particularly for use as electrical insulating materials or structural materials. Generally, these laminates are not heat-resistant, even if the laminate is produced from an epoxy resin or a polyester resin, if it is subjected to temperatures of 180° C. for any length of time, the laminate can become deteriorated easily by heat. For instance, if the laminate is used as insulation for electrical instruments where the temperatures of 180° C. or higher are developed, the laminate can become deteriorated and decomposed and the electrical insulating value of the laminate will consequently be reduced. Accordingly, this type of laminate has proven to be unacceptable for use in small type, large capacity electrical instruments, or for many structural applications.

It is aso known to use a polyimide having a three-dimensional network structure, formed by heating and homopolymerizing an N,N'-substituted dimaleimide as a heat-resistant resin. This type of polyimide resin, however, is very brittle, owing to the high degree of cross-linking, and hence, they are unsuitable for practical use because they are subject to cracking induced by heat-cycling.

A need exists, therefore, for a thermosetting resin composition which is characterized by excellent heat-resistivity, good resistance to cracking induced by heat-cycling, and which possesses excellent mechanical strength, good bonding properties, and good moldability.

SUMMARY OF THE INVENTION

Accordingly, it is one object of this invention to provide a thermosetting resin composition (polyimide resin) which possesses excellent heat-resistance, excellent mechanical strength, good bonding properties, and good resistance to cracking induced by heat-cycling, and when used in a laminate structure is characterized by good moldability.

This and other objects have now hereinbeen attained by providing a heat-resistant thermosetting resin composition formed by mixing and heating (a) 85 to 55% by mol of an N,N'-substituted dimaleimide represented by the following general formula:

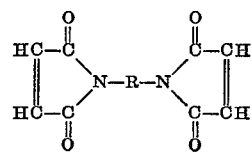

where R is

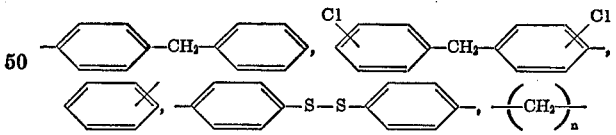

$n$ is an integer of from 1 to 6; with (b) 15 to 45% by mol of an isocyanuric acid and/or derivative thereof represented by the following general formula:

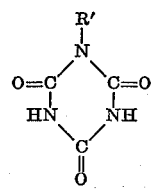

where R' is H or a member selected from the group consisting of alkyl, and allyl.

In this case, the polymerization reaction of the above mixture (a+b) may be carried out as it is, or may be carried out in a suitable solvent, such as dimethyl formamide, and if necessary, in the presence of a tertiary amine, such as triethylamine, as a reaction catalyst.

DETAILED DESCRIPTION OF THE INVENTION

The N,N'-substituted dimaleimide used as the first component in this invention is represented by the following formula:

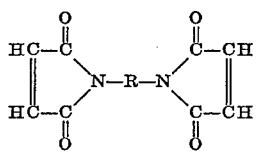

where R is

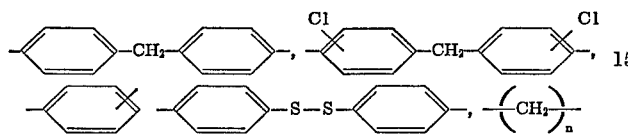

etc.; n is an integer of from 1 to 6;

Suitable such compounds include N,N'-methylene bis-phenyl maleimide, N,N'-oxy bis-phenyl maleimide, hexamethylene bis-maleimide and N,N'-ethylene bis-phenyl maleimide and the like, or mixtures thereof.

The isocyanuric acid derivative used as the second component in this invention is represented by the following general formula:

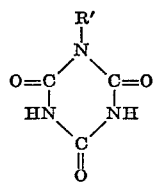

where R' is H or a member selected from the group consisting of alkyl, and allyl. For instance, R' may be lower alkyl, and lower allyl. If R' is H, the formula represents an isocyanuric acid.

The derivative of isocyanuric acid may conveniently be prepared as follows. 1 mol of isocyanuric acid is mixed with 1 mol of lauryl alcohol, allyl glycidyl ether, phenyl glycidyl ether, or the like. The mixture is heated to a temperature of 150° C. and the temperature of the reaction system is raised slowly to 220° C. for about 5 hours. The mixture is then reacted at a temperature of 220° C. for 3 hours until a corresponding derivative of isocyanuric acid is prepared.

It is desirable to use the N,N'-substituted dimaleimide in an amount of between 60 and 80 mol percent and the isocyanuric acid within the range of 40 to 20 mol percent. If less than 60 mol percent of the imide is used, gelation can occur in the reaction system and the desired heat-resistant thermosetting resin composition cannot be obtained. On the contrary, if the component ratio of N,N'-substituted dimaleimide exceeds 80 mol percent, excellent mechanical strength cannot be attained and cracking induced by heat-cycling will not be minimized.

If a derivative of isocyanuric aid is used instead of isocyanuric acid per se, the derivative should be used preferably in amounts of 45 to 55 mol percent and the N,N'-substituted dimaleimide should preferably be used in an amount of from 55 to 85 mol percent. In this case, if the component ratio of N,N'-substituted dimaleimide is less than 55 mol percent, gelation will often occur in the reaction system and a desired heat-resistant thermosetting resin composition cannot be obtained. On the contrary, if the component ratio of N,N'-substituted dimaleimide exceeds 85 mol percent, the polymer will be characterized by poor mechanical strength and cracking induced by heat-cycling will not be minimized.

The polymerization reaction between the N,N'-substituted dimaleimide and the isocyanuric acid or derivative of isocyanuric acid will yield high molecular weight products of a thermosetting resin nature. The reaction can be represented by the formula:

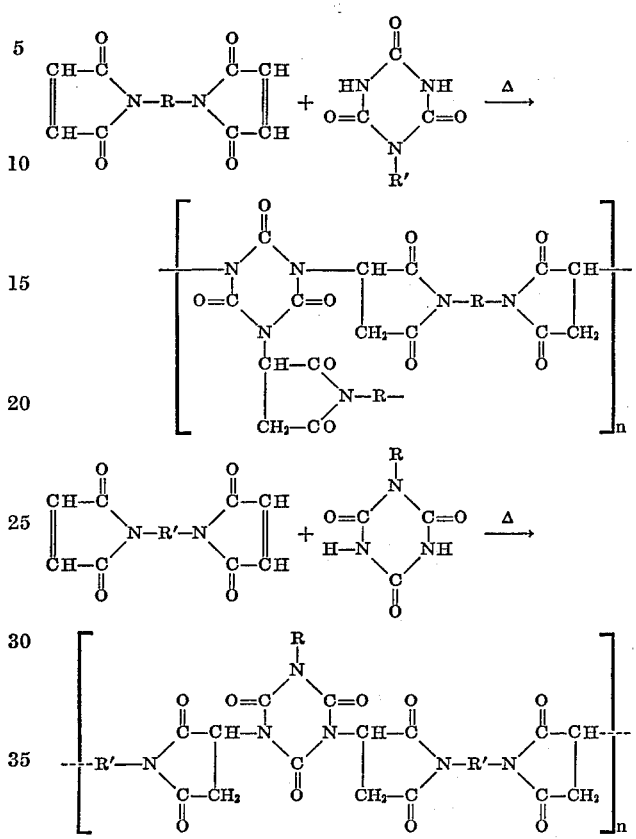

where

R and R' are the same as above described.
n is an integer.

Since the isocyanuric acid or derivative thereof is active and tri-functional, the chemical structure easily forms into a three-dimensional network.

The N,N'-substituted maleimide-isocyanuric acid or its derivative resin will be easily cross-linked due to the chemical activity of the isocyanuric acid. The degree of cross-linking, however, can be adjusted quite adequately by use of a derivative of isocyanuric acid instead of isocyanuric acid per se. Accordingly, brittleness of the resin due to cross-linking and three-dimensional network formation can be adjusted and the degree of flexibility of the resin can be predetermined. The resulting product is characterized by good mechanical strength, good resistance to cracking induced by heat-cycling, good bondability and good laminatability.

Moreover, by using a derivative of isocyanuric acid, the reaction can be easily controlled. The use of a derivative of isocyanuric acid minimizes cracking induced by heat-cycling and permits adjustment of the degree of cross-linking of the product. The introduction of the monovalent compound into the derivative provides a much superior product to that formed by homopolymerizing a bis-maleimide as in the prior art. In particular, brittleness of the cured resin is superior, flexibility of the resin is superior, and cracking induced by heat-cycling is minimized.

Having now generally described the invention, a further understanding can be attained by reference to certain specific examples which are provided herein for purposes of illustration only and are not intended to be limiting unless otherwise specified.

EXAMPLE 1

111 g. (0.3 mol) of N,N'-methylene bis phenyl maleimide, 24 g. (0.18 mol) of isocyanuric acid, 100 g. of dimethyl formamide and 0.1 g. of triethylamine are poured and mixed into a 500 ml. three-necked flask equipped with stirrer and thermometer. The mixture in the flask is stirred and heated. The reaction mixture is maintained at the temperature of 135 to 150° C. for four hours. A brownish-black viscous liquid product is prepared.

The reaction product obtained as above mentioned is impregnated into a glass cloth pre-treated with a spreading agent of γ-aminopropyl triethoxysilane, and is coated on the glass cloth. After drying for three minutes at a temperature of 160° C., the treated glass cloth (namely, the prepreg) is prepared. The prepreg is cut into numerous sheets and the sheets are piled one on the other. This is hot pressed at a temperature of 200° C. for thirty minutes using a hot press operating at a pressure of 100 kg./cm.$^2$ to form a laminate. During hot pressing, the structure is degassed several times. After heating and curing at a temperature of 220° C. for ten hours, the laminate is cooled to 25° C. The flexural strength (or bending strength) of the laminate after treating as above described is 58 kg./mm.$^2$. After the laminate is maintained at a temperature of 250° C. for two hundred hours, the flexural strength is 57 kg./mm.$^2$. Moreover, the flexural strength if 56.5 kg./mm.$^2$ when measured at a temperature of 200° C.

EXAMPLE 2

A mixture of 110 g. (0.3 mol) of N,N'-methylene bis phenyl maleimide and 15 g. (0.12 mol) of isocyanuric acid is reacted under the same conditions as described in Example 1.

A heat-resistant thermosetting resin is prepared.

A laminate is prepared under the same conditions as mentioned in Example 1 by using the resin obtained. The initial value of the flexural strength of the laminate if 55 kg./mm.$^2$. After the laminate is maintained at a temperature of 250° C. for two hnudred hours, the flexural strength is 54.5 kg./mm.$^2$. Moreover, the flexural strength is 24 kg./mm.$^2$ (same as the initial value) when measured at a temperature of 200° C.

EXAMPLE 3

N,N'-oxy bis phenyl maleimide, hexamethylene bis-maleimide, N,N'-methylene bis phenyl maleimide and isocyanuric acid are selected in the composition ratios (by weight and by mol) as shown in Table I.

The two types of heat-resistant thermosetting resins and one control are prepared under the same conditions as described in Example 1.

TABLE I

| | Sample | | |
|---|---|---|---|
| | A | B | Control |
| Component: | | | |
| N,N'-oxy bis phenyl maleimide | 107.4 (0.3) | | |
| Hexamethylene bis maleimide | | 50 (0.43) | |
| N,N'-methylene bis phenyl maleimide | | 50 (0.14) | 100 |
| Isocyanuric acid | 20 (0.15) | 20 (0.15) | |
| Flexural strength, kg./mm.$^2$: | | | |
| Initial value | 50 | 53 | 25 |
| 250° C., 200 hrs | 58 | 51 | |
| 200° C | | 49.5 | |

These resin solutions obtained are impregnated into glass cloth pre-treated with the spreading agent, γ-aminopropyl triethoxysilane. After drying and heating, the prepregs are prepared respectively. Thereafter, the prepreg laminates are formed by hot pressing a pile of several sheets. The flexural strength of the laminate at room temperature, the flexural strength of the laminate measured at 200° C., and the flexural strength of the laminate heated and thermoset at a temperature of 250° C. for 200 hours, and measured at room temperature are shown in Table I, respectively.

EXAMPLE 4

111 g. (0.31 mol) of N,N'-methylene bis phenyl maleimide are reacted with 15 g. (0.12 mol) of isocyanuric acid at a temperature of 150° C. to 160° C. for thirty minutes by heating as described in Example 1. A viscous liquid resin is prepared as the reaction product. The resin is solidified by cooling. The solidified resin is crushed and pulverized. The powdered resin is introduced into a mold. The mold is introduced between the plates of a hot press heated at a temperature of 200° C. and a pressure of 50 kg./cm.$^2$ is applied. These conditions are maintained for thirty minutes to form a mold.

The flexural strength of the mold treated by heating at 200° C. for 10 hours is 9.3 kg./mm.$^2$ when measured at room temperature. The flexural strength of the mold measured at a temperature of 200° C. is 8.5 kg./mm.$^2$. The flexural strength of the mold treated by heating at a temperature of 250° C. for 200 hours is 9.0 kg./mm.$^2$ when measured at room temperature.

EXAMPLE 5

180 g. (0.5 mol) of N,N'-methylene bis phenyl maleimide, 73 g. (0.3 mol) of isocyanuric acid derivative modified with allyl glycidyl ether, 250 g. of dimethyl formamide and 0.1 g. triethylamine are poured and mixed into a 500 ml. three-neck flask equipped with a stirrer and thermometer. The mixture in the flask is stirred and heated. The reaction system of the mixture is maintained at a temperature of 145 to 155° C. for one hour. A brownish-black viscous liquid product is prepared. The product placed on the hot plate heated at a temperature of 200° C. is coagulated after sixty seconds.

The reaction product obtained as above mentioned is impregnated into a glass cloth which has been pre-treated with γ-aminopropyl triethoxysilane as a spreading agent, and is coated on the glass cloth. After drying for six minutes at a temperature of 160° C., the treated glass cloth (namely, the prepreg) is prepared. The prepreg is cut into numerous sheets and several of the sheets are piled one on the other. The composite is hot pressed at a temperature of 200° C. for thirty minutes using a hot press operating at a pressure of 100 kg./cm.$^2$ to form a laminate. During hot pressing, the laminate is degassed twice. After heating and curing at a temperature of 220° C. for ten hours, the laminate is cooled to 25° C. The flexural strength (or bending strength) of the laminate is 56 kg./mm.$^2$ at room temperature. After the laminate is maintained at a temperature of 250° C. for 200 hours, the flexural strength is 53 kg./mm.$^2$ by measuring at room temperature. Moreover, the flexural strength is 54.5 kg./mm.$^2$ by measuring at a temperature of 200° C.

EXAMPLE 6

The mixture of 180 g. (0.5 mol) of N,N'-methylene bis phenylmaleimide and 62 g. (0.2 mol) of isocyanuric acid derivatives modified with lauryl alcohol is reacted under the same condition as described in Example 5. A heat-resistant thermosetting resin is prepared.

A laminate is prepared under the same condition as mentioned in Example 5 by using the resin obtained. The initial value of the flexural strength of the laminate if 50 kg./mm.$^2$. After the laminate is maintained at a temperature of 250° C. for two hundred hours, the flexural strength is 48.5 kg./mm.$^2$ when measured at room temperature. Moreover, the flexural strength is 48 kg./mm.$^2$ (same as initial value) when measured at a temperature of 200° C.

EXAMPLE 7

N,N'-oxy bis phenyl maleimide, hexamethylene bis maleimide, N,N'-methylene bis phenyl maleimide and isocyanuric acid derivatives modified with lauryl alcohol or glycidyl ether are selected in the composition ratios (by mol) as shown in Table II.

The five types of heat-resistant thermosetting resin are prepared under the same conditions as described in Example 5.

TABLE II

| Component: | A | B | C | D | E |
|---|---|---|---|---|---|
| N,N'-methylene bis phenyl maleimide | 0.5 | | | 0.25 | |
| Hexamethylene bis maleimide | | | 0.5 | 0.25 | |
| N,N'-oxy bis phenyl maleimide | | 0.5 | | | 0.5 |
| Isocyanuric acid derivatives modified with lauryl alcohol | 0.3 | | | 0.2 | 0.1 |
| Isocyanuric acid derivatives modified with phenyl glycidyl ether | | 0.2 | 0.4 | | 0.1 |
| Flexural strength, kg./mm.²: | | | | | |
| Initial value | 52 | 55 | 49 | 50 | 51 |
| 250° C., 200 hr | 50 | 54 | 46 | 49 | 49 |
| 200° C | 49 | 54 | 47 | 48 | 50 |

These resin solutions obtained are impregnated into glass cloths pre-treated with α-aminopropyl triethoxysilane as a spreading agent. After drying and heating, the prepregs are prepared respectively. Thereafter, by hot pressing of a pile of several sheets of the prepreg, laminates are formed respectively. The flexural strength of the laminates at room temperature, the flexural strength of the laminate measured at a temperature of 200° C., and the flexural strength of the laminate heated and thermoset at a temperature of 250° C. for 200 hours, and measured at room temperature are shown in Table II, respectively.

EXAMPLE 8

180 g. (0.5 mol) of N,N'-methylene bis phenyl maleimide are reacted with 26 g. (0.1 mol) of isocyanuric acid derivative modified with butyl glycidyl ether at a temperature of 145 to 155° C. for thirty minutes by heating as described in Example 5. A viscous liquid resin is prepared as the reaction product. The resin is solidified by cooling. The resin is solidified, crushed and pulverized. The powdered resin is introduced into a mold. The mold is introduced between the plates of a hot press heated at a temperature of 200° C. and a pressure of 50 kg./cm.² is applied. These conditions are maintained for thirty minutes to form a mold.

The flexural strength of the mold treated by heating at a temperature of 200° C. for 10 hours is 9.3 kg./mm.² when measured at room temperature. The flexural strength of the mold measured at a temperature of 200° C. is 8.5 kg./mm.². The flexural strength of the mold treated by heating at a temperature of 250° C. for 200 hours is 9.0 kg./mm.² when measured at room temperature.

Having now fully described the invention, it will be apparent to one of ordinary skill in the art that many changes and modifications can be made thereto without departing from the spirit or scope of the invention.

Accordingly, what is claimed as new and intended to be covered by Letters Patent is:

1. A heat-resistant thermosetting resin composition which consisting essentially of the reaction product of
   (a) 85–55% by mol of an N,N'-substituted dimaleimide represented by the formula:

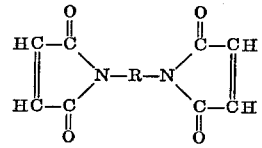

wherein R is

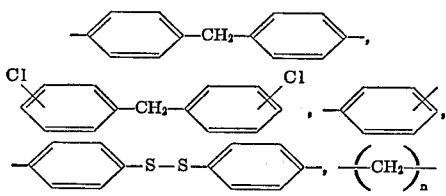

$n$ is an integer of from 1 to 6;
with
   (b) 15–45% by mol of an isocyanuric acid or derivative thereof represented by the formula:

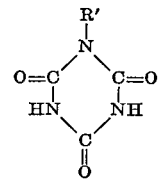

wherein R' is H or a member selected from the group consisting of alkyl and allyl.

References Cited

UNITED STATES PATENTS

| 3,429,947 | 2/1969 | Eygen et al. | 260—836 |
| 3,625,912 | 12/1971 | Vincent | 260—30.2 |
| 3,658,764 | 4/1972 | Bargain et al. | 260—78 UA |
| 3,669,930 | 6/1972 | Asahara et al. | 260—47 CZ |

LESTER L. LEE, Primary Examiner

U.S. Cl. X.R.

117—124 E; 161—197; 260—32.6 N, 47 CZ, 47 CP; 264—140